United States Patent [19]

Bjorklund et al.

[11] 4,432,597
[45] Feb. 21, 1984

[54] TRANSMISSIVE HOLOGRAPHIC OPTICAL ELEMENT ON ABERRATING SUBSTRATE

[75] Inventors: Gary C. Bjorklund, Los Altos; Glenn T. Sincerbox, San Jose, both of Calif.

[73] Assignee: International Business Machines Corporation, Armonk, N.Y.

[21] Appl. No.: 216,093

[22] Filed: Dec. 15, 1980

[51] Int. Cl.³ .................. G02B 5/32; G03H 1/22
[52] U.S. Cl. ...................... 350/3.70; 350/3.85
[58] Field of Search .............. 350/3.61, 3.64, 3.7, 350/3.72, 3.75, 3.76, 3.83, 3.85, 3.86

[56] References Cited

U.S. PATENT DOCUMENTS

| | | | |
|---|---|---|---|
| 3,514,176 | 5/1970 | Brooks et al. | 350/3.5 |
| 3,532,406 | 10/1970 | Hartman | 350/3.85 |
| 3,586,412 | 6/1971 | Leith | 350/3.5 |
| 3,598,466 | 8/1971 | Friedl | 350/3.5 |
| 3,601,466 | 8/1971 | Tsuruta | 350/3.5 |
| 3,767,284 | 10/1975 | Dammann | 350/3.5 |
| 4,384,759 | 5/1983 | Ferrante | 350/3.7 |

OTHER PUBLICATIONS

Ward et al., Lens Aberration Correction by Holography, *Applied Optics*, vol. 10, No. 4, Apr. 1971, pp. 896-900.

Leith et al., Holographic Imagery Through Diffusing Media, Journal of the Optical Society of America, Apr. 1966, p. 523.

*Primary Examiner*—Bruce Y. Arnold
*Assistant Examiner*—William Propp
*Attorney, Agent, or Firm*—Joseph E. Kieninger

[57] ABSTRACT

An inexpensive, high quality transmissive holographic optical element and method for making same are described. The holographic optical element consists of a potentially aberrating substrate which supports a layer of holographic recording material. The material contains a recorded fringe pattern that cancels the aberrations induced in an image wavefront as it passes through the aberrating substrate. This optical element is formed by a method having the following steps. A first wavefront from a source, for example a point focus, is passed through the aberrating substrate, becomes distorted, and then passes through the holographic recording material to a wavefront conjugator. The conjugator launches a conjugate of the distorted wavefront back to the holographic recording material. A second wavefront is then passed through the holographic recording material to form a fringe pattern or hologram as a result of the interference of the conjugate waveform and the second waveform. Subsequently, the developed holographic optical element is illuminated with a reconstruction wave which is the duplicate of the reference wave. Passage of this reconstruction wave through the holographic layer results in an emerging wavefront identical to the conjugated distorted wavefront which is then converted to the original wavefront as it passes through the aberrating substrate.

8 Claims, 3 Drawing Figures

TRANSMISSIVE HOLOGRAPHIC OPTICAL ELEMENT ON ABERRATING SUBSTRATE

DESCRIPTION

1. Technical Field

This invention relates to holography and more particularly to a transmissive holographic optical element and a method for its fabrication.

It is a primary object of this invention to provide a high quality transmissive holographic optical element and a method for its fabrication.

It is a further object of this invention to provide an inexpensive high quality transmissive holographic optical element and a method for its fabrication.

2. Background Art

Transmissive holographic optical elements are used in scanners, display applications, spectroscopic applications, and as replacements for conventional refractive elements. These holographic optical elements are in general expensive since they require an aberration-free substrate, for example, a polished glass flat. The cost of a polished glass flat in a holographic element is responsible for most of the expense of the element. The use of a potentially aberrating substrate such as a molded plastic, could reduce the price of the element substantially.

The U.S. Pat. Nos. to Brooks et al, 3,514,176; Dammann, 3,767,284; Leith, 3,586,412; Friedl, 3,598,466; and to Tsuruta, 3,601,466, describe various methods of preparing a hologram for use in an optical element. All of the methods in these patents require the use of an aberration-free substrate. Aberrating substrates have not heretofore been used in transmissive holographic optical elements since they distort the emerging wavefront.

BRIEF DESCRIPTION OF THE DRAWINGS

In the accompanying drawings, forming a material part of this disclosure.

DISCLOSURE OF THE INVENTION

For further understanding of the invention and of the objects and advantages thereof, reference will be had to the following description and the accompanying drawings, and to the appended claims in which the various novel features of the invention are more particularly set forth.

An inexpensive, high quality transmissive holographic optical element and method for making are described. The holographic optical element consists of a potentially aberrating substrate which supports a layer of holographic recording material. The material contains a recorded fringe pattern that cancels the aberrations induced in an image wavefront as it passes through the aberrating substrate. This optical element is formed by a method having the following steps. A first wavefront from a source, for example a point focus, is passed through the aberrating substrate, becomes distorted, and then passes through the holographic recording material to a wavefront conjugator. The conjugator launches a conjugate of the distorted wavefront back to the holographic recording material. A second wavefront is then passed through the holographic recording material to form a fringe pattern or hologram as a result of the interference of the conjugate waveform and the second waveform. Subsequently, the developed holographic optical element is illuminated with a reconstruction wave which is the duplicate of the second wavefront, i.e., the reference wave. Passage of this reconstruction wave through the holographic layer results in an emerging wavefront identical to the conjugated distorted wavefront which is then converted to the original wavefront as it passes through the aberrating substrate.

BEST MODE OF CARRYING OUT THE INVENTION

Figure 1A:
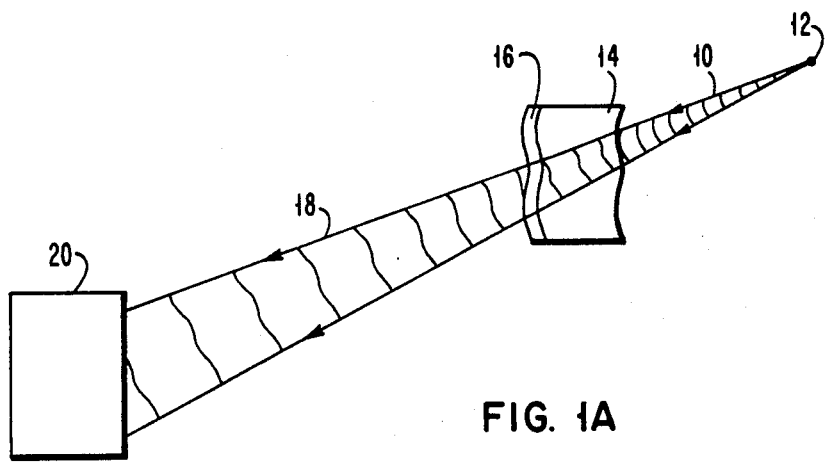
FIGS. 1A and 1B are schematic views of steps in making the holographic optical element in accordance with this invention.
Figure 1B:
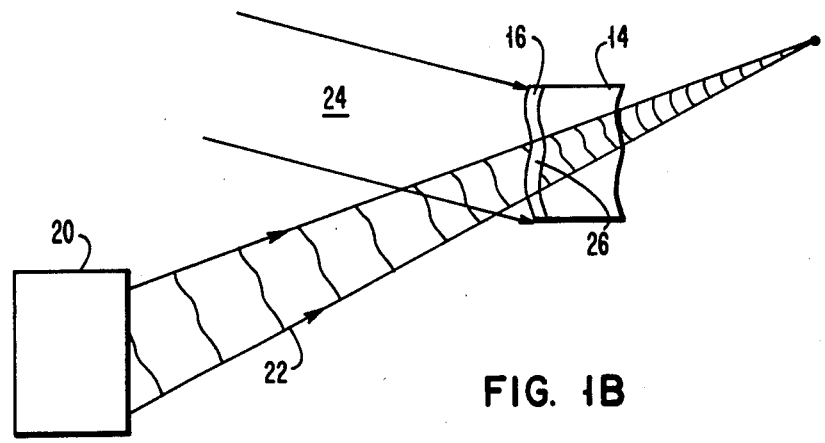

As shown in FIG. 1A, a wavefront 10, for example a diverging spherical wavefront, emerging from a point focus 12 at a desired location travels in the direction indicated through the aberrating substrate 14 and through the layer 16 of the holographic recording material that is positioned on the substrate 14. A suitable non-limiting low-cost aberrating substrate 14 material is polymethylmethacrylate. A suitable non-limiting holographic recording material is dichromated gelatin. The emerging aberrated wavefront 18 travels and is incident on a wavefront conjugator 20. The function of the conjugator 20 is to launch a conjugate wavefront 22 as shown in FIG. 1B back towards the recording layer 16.

The next step is to simultaneously pass a reference wave 24 through the layer 16 of holographic recording material. A hologram 26 contains a recorded fringe pattern that is formed by the interference of the reference wave 24 and the conjugate wavefront 22. The holographic recording material in layer 16 is then developed by conventional method well known in the art to produce the desired holographic optical element 28 that is shown in FIG. 2.

Figure 2:
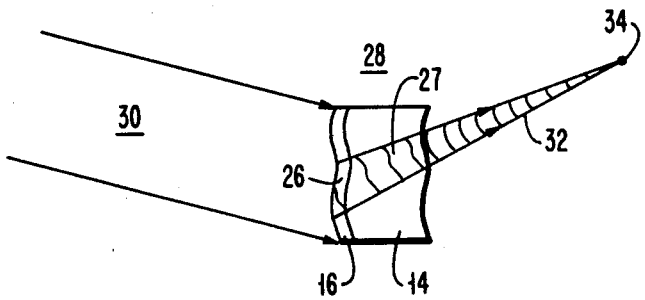
FIG. 2 is a schematic showing the use of the holographic optical element made in accordance with this invention.

The holographic optical element 28 is used in a manner illustrated in FIG. 2. A reconstruction wave 30, which is a duplicate of the reference wave 24, travels through the layer 16 where a portion of the light energy is diffracted to form an image wave 27 with a distorted wavefront. The reconstructed image wave 27 is distorted additionally by the aberrating substrate 14 as it passes therethrough. However, the initial distortion produced by the hologram 26 exactly cancels the wavefront distortions or aberrations introduced by the substrate 14. As a result, the emerging wavefront 32 is a perfect wavefront conjugate to wavefront 10, for example, a converging spherical wave, focused at the desired location 34.

The holographic optical element 28 shown in FIG. 2 is is a low-cost element which permits its use in numerous applications where the high cost of a similar element utilizing a polished glass flat is required.

The wavefront conjugator 20 shown in FIGS. 1A and 1B can operate in either a static or dynamic mode. A static conjugator 20 would be based upon standard holographic techniques. In this case, during the first step, the hologram of the aberrated diverging wave would be recorded using an additional reference wave (not shown). After this auxiliary hologram is developed, it is illuminated by the conjugate to the original additional reference wave, resulting in the formation of the object wave for the second step. The disadvantages of a static conjugator 20 are that substrates for the auxiliary hologram must be of high quality, that is expensive, in that the developed auxiliary hologram must be precisely positioned unless an in-situ recording material such as a photo polymer is used. In either case, a new recording surface must be used for each holographic optical element.

A dynamic conjugator 20 would be based upon degenerate 4-wave mixing. In this case, no development of the auxiliary hologram is necessary and the conjugate of the aberrated diverging wave is generated in real time. Thus, the first and second steps occur simultaneously. The advantages of using a dynamic conjugator are (a) that the nonlinear medium can be used to produce an arbitrary number of holographic optical elements such as the facets on a scanner disk or cylinder, (b) that high quality optical elements are not required, and (c) that only one development step is required.

The disadvantage of using a dynamic conjugator 20 is that an extraneous reflection type hologram is also recorded in the layer 16 in addition to the desired hologram. There are a number of methods which can be used to eliminate the extraneous reflection type hologram which occurs when a dynamic conjugator is utilized.

One method involves providing a slight misalignment of the reconstruction wave from the direction of the reference wave or a slight wavelength shift. Due to the very high sensitivity of reflection holograms to deviation from Bragg's law, the slight misalignment or wavelength shift will totally suppress all diffraction from the reflection type hologram.

Another method involves selecting a holographic recording material which has a modulation transfer function (MTF) which cuts off at high spatial frequencies. Since the spatial frequencies in the desired hologram will be on the order of 500 lines/mm, while the spatial frequencies in the reflection hologram will be of the order of 3000 lines/mm, a layer 16 of a material having an MTF cut off between 500 and 3000 mm will effectively descriminate between the two and inhibit the formation of a reflection hologram.

Another method would be to configure the dynamic conjugator 20 in such a way that the polarization of the conjugate wave would be rotated by 90° with respect to the polarization of the original diverging spherical wave. The polarization of the reference wave would then be chosen to be parallel to that of the conjugate wave. Thus, both the conjugate wave and the reference wave would interfere with each other, but would not interfere with the original diverging wave and no reflection holograms would be formed.

Still another method would be to pump the dymanic conjugator 20 with coherent light of frequency $\omega + \Delta\omega$, while the original diverging spherical wave would be at a frequency $\omega$. The conjugate wave would then be at a frequency $\omega - \Delta\omega$, and if the frequency of the reference wave were also adjusted to $\omega - \Delta\omega$, stationary fringes would be formed only by the interference between the reference wave and the conjugate wave. The fringes corresponding to the reflection holograms would not be stationary and would wash out for exposure times $> \Delta\omega^{-1}$.

While I have illustrated and described the preferred embodiments of my invention, it is understood that I do not limit myself to the precise constructions herein disclosed and the right is reserved to all changes and modifications coming within the scope of the invention and defined in the appended claims.

What is claimed is:

1. A method for using a transmissive holographic optical element comprising the steps of
   passing a first coherent wavefront through an aberrating substrate and a holographic recording material supported thereon to a wavefront conjugator to launch a conjugate wavefront back toward the holographic recording material,
   passing a second coherent wavefront to said holographic recording material whereby said second wavefront interferes with said conjugate wavefront to form a fringe pattern which is recorded in the holographic material,
   developing the holographic material to form a holographic optical element, and
   passing a third coherent wavefront having substantially the same wavelength and wavefront shape as said second wavefront through said optical element, thereby resulting in an emerging coherent wavefront conjugate to said first wavefront.

2. A method as described in claim 1 whereby a static wavefront conjugator is used.

3. A method as described in claim 1 whereby a dynamic wavefront conjugator is used and the first and second steps are done simultaneously to form an extraneous reflection type hologram in addition to the desired hologram.

4. A method in accordance with claim 3 whereby said third wavefront is shifted slightly in wavelength from the wavelength of said second wavefront so as to totally suppress all diffraction from said extraneous hologram.

5. A method in accordance with claim 3 whereby said third wavefront is shifted slightly in direction from the direction of said second wavefront so as to totally suppress all diffraction from said extraneous hologram.

6. A method as described in claim 3 whereby said holographic recording material is selected to have a modulation transfer function which cuts off at high spatial frequencies between 500 and 3000 lines/mm so as to inhibit the formation of said extraneous hologram.

7. A method as described in claim 3 whereby the conjugator is configured so that the polarization of the conjugate wave is rotated by 90° with respect to the polarization of said first wavefront and the polarization of the second wave is selected to be parallel to that of the conjugate wave so as to inhibit the formation of said extraneous hologram.

8. A method as described in claim 3 whereby said conjugator is pumped with coherent light of frequency $\omega + \Delta\omega$ while said first wavefront is at a frequency $\omega$ and the frequency of said second wavefront is adjusted to $\omega - \Delta\omega$ so as to inhibit the formation of said extraneous hologram.

* * * * *